US011014506B2

(12) United States Patent
Dry et al.

(10) Patent No.: US 11,014,506 B2
(45) Date of Patent: May 25, 2021

(54) VEHICLE HAVING A TRACK ASSEMBLY AND A CARRIAGE ASSEMBLY

(71) Applicant: Ford Global Technologies, LLC, Dearborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 16/440,303

(22) Filed: Jun. 13, 2019

(65) Prior Publication Data
US 2020/0391667 A1 Dec. 17, 2020

(51) Int. Cl.
*B60N 2/07* (2006.01)
*B60R 11/00* (2006.01)
*B62D 33/06* (2006.01)

(52) U.S. Cl.
CPC ............ *B60R 11/00* (2013.01); *B60N 2/0722* (2013.01); *B62D 33/06* (2013.01); *B60R 2011/0003* (2013.01); *B60R 2011/0084* (2013.01); *B60R 2011/0092* (2013.01)

(58) Field of Classification Search
CPC ............... B60R 16/037; B60R 11/00; B60R 2011/0003; B60R 2011/0084; B60R 2011/0092; B60N 2/01566; B60N 2/07; B60N 2/0722; B60N 2002/0264
USPC ............ 296/65.13–65.15; 297/217.3, 344.11; 248/429
See application file for complete search history.

(56) References Cited

U.S. PATENT DOCUMENTS

| 6,267,430 | B1 | 7/2001 | Cresseaux | |
|---|---|---|---|---|
| 6,270,140 | B1 | 8/2001 | Opfer et al. | |
| 7,000,967 | B2 | 2/2006 | Oshima et al. | |
| 2004/0110402 | A1* | 6/2004 | Jones | H01R 13/6315 439/137 |
| 2005/0258676 | A1* | 11/2005 | Mitchell | B64D 11/0624 297/216.13 |
| 2006/0255614 | A1* | 11/2006 | Gray | B60N 2/01575 296/65.13 |
| 2007/0018047 | A1* | 1/2007 | Wodak | B64D 11/0696 244/122 R |
| 2019/0126780 | A1* | 5/2019 | Dry | B60N 2/0722 |
| 2019/0126786 | A1* | 5/2019 | Dry | B60N 2/14 |
| 2019/0263295 | A1* | 8/2019 | Dry | B60N 2/01 |
| 2019/0337417 | A1* | 11/2019 | Condamin | B60N 2/20 |

(Continued)

FOREIGN PATENT DOCUMENTS

| CN | 207106248 U | 3/2018 |
|---|---|---|
| DE | 19851392 A1 | 5/1999 |

(Continued)

*Primary Examiner* — Gregory A Blankenship
(74) *Attorney, Agent, or Firm* — David Coppiellie; Price Heneveld LLP

(57) ABSTRACT

A vehicle includes a cabin, a track assembly that is mounted to the cabin, and a carriage assembly that is received by the track assembly. The track assembly includes a rail structure and a conductive member coupled to the rail structure. The carriage assembly includes a brush that is movable to an extended position to engage with the conductive member of the track assembly and a first biasing member that provides an extension force when the brush is in the extended position.

18 Claims, 13 Drawing Sheets

(56) References Cited

U.S. PATENT DOCUMENTS

| | | | |
|---|---|---|---|
| 2019/0337471 A1* | 11/2019 | Brehm | B60N 2/08 |
| 2020/0079243 A1* | 3/2020 | Bork | B60N 2/0228 |
| 2020/0171982 A1* | 6/2020 | Dry | B60N 2/062 |
| 2020/0171983 A1* | 6/2020 | Dry | B60N 2/14 |
| 2020/0189498 A1* | 6/2020 | Line | B60R 16/027 |
| 2020/0189511 A1* | 6/2020 | Ricart | B60R 21/207 |
| 2020/0194936 A1* | 6/2020 | Ricart | H01R 13/73 |
| 2020/0194948 A1* | 6/2020 | Lammers | H01R 13/113 |
| 2020/0207241 A1* | 7/2020 | Moulin | B60N 2/0806 |
| 2020/0223378 A1* | 7/2020 | Mushiake | H01F 38/14 |
| 2020/0247278 A1* | 8/2020 | Dry | B60N 2/0722 |
| 2020/0254905 A1* | 8/2020 | Dry | B60N 2/0292 |
| 2020/0290484 A1* | 9/2020 | Line | B60N 2/0244 |
| 2020/0346531 A1* | 11/2020 | Dry | E05D 15/0686 |
| 2020/0346546 A1* | 11/2020 | Oh | G06F 3/01 |
| 2020/0346561 A1* | 11/2020 | Dry | B60N 2/0232 |
| 2020/0346564 A1* | 11/2020 | Dry | B60R 7/04 |
| 2020/0391667 A1* | 12/2020 | Dry | B60R 11/00 |
| 2020/0391668 A1* | 12/2020 | Dry | B62D 33/06 |

FOREIGN PATENT DOCUMENTS

| | | |
|---|---|---|
| DE | 102004060718 A1 | 6/2006 |
| DE | 102009024631 A1 | 2/2010 |
| FR | 2762814 A1 | 4/1997 |
| FR | 2762815 A1 | 4/1997 |
| JP | WO2013161620 A1 | 12/2015 |
| WO | 03004304 A1 | 1/2003 |

* cited by examiner

US 11,014,506 B2

VEHICLE HAVING A TRACK ASSEMBLY AND A CARRIAGE ASSEMBLY

FIELD OF THE DISCLOSURE

The present disclosure generally relates to vehicles. More specifically, the present disclosure relates to a vehicle that has a track assembly and a carriage assembly.

BACKGROUND OF THE INVENTION

Vehicles are often provided with a number of components within a cabin of the vehicle. Some of these components can be slightly adjusted by users. Additional solutions are needed that provide users with greater opportunities for personalization.

SUMMARY OF THE INVENTION

According to a first aspect of the present disclosure, a vehicle includes a cabin, a track assembly that is mounted to the cabin, and a carriage assembly that is received by the track assembly. The track assembly includes a rail structure and a conductive member coupled to the rail structure. The carriage assembly includes a brush that is movable to an extended position to engage with the conductive member of the track assembly and a first biasing member that provides an extension force when the brush is in the extended position.

Embodiments of the first aspect of the present disclosure can include any one or a combination of the following features:
- the carriage assembly further includes a cam structure that actuates the brush between the extended position and a retracted position;
- the cam structure is rotated about a vertical axis to actuate the brush between the extended position and the retracted position;
- the cam structure acts upon the first biasing member, wherein the first biasing member in turn acts upon the brush;
- the cam structure includes a major axis and a minor axis;
- the major axis of the cam structure acts upon the brush in a manner that actuates the brush to the extended position;
- the minor axis of the cam structure acts upon the brush in a manner that actuates the brush to the retracted position;
- the cam structure has a cross-sectional shape that is elliptical;
- the first biasing member is a coil spring;
- the first biasing member is a leaf spring;
- a second biasing member that provides a retraction force, wherein the retraction force opposes the extension force of the first biasing member; and
- the second biasing member biases the brush to a retracted position.

According to a second aspect of the present disclosure, a vehicle includes a cabin. A track assembly is mounted within the cabin. The track assembly includes a rail structure and a conductive member coupled to the rail structure. A carriage assembly is received by the track assembly. The carriage assembly includes a brush, a cam structure, and a first biasing member. The brush is movable to an extended position to engage with the conductive member of the track assembly. The cam structure is rotatable relative to the carriage assembly to actuate the brush between the extended position and a retracted position. The cam structure includes a major axis and a minor axis. The major axis of the cam structure corresponds with actuation of the brush to the extended position. The minor axis of the cam structure corresponds with the retracted position of the brush. The first biasing member is positioned between the cam structure and the brush. The cam structure acts directly upon the first biasing member. The first biasing member provides an extension force when the brush is in the extended position.

Embodiments of the second aspect of the present disclosure can include any one or a combination of the following features:
- a second biasing member that provides a retraction force to the brush, wherein the retraction force opposes the extension force of the first biasing member;
- the cam structure has a cross-sectional shape that is elliptical;
- the first biasing member is a coil spring; and
- the first biasing member is a leaf spring.

According to a third aspect of the present disclosure, a vehicle includes a cabin, a track assembly mounted within the cabin, and a carriage assembly that is received by the track assembly. The track assembly includes a rail structure and a conductive member coupled to the rail structure. The carriage assembly includes a brush that is movable to an extended position to engage with the conductive member of the track assembly. The carriage assembly also includes a cam structure. The cam structure is rotatable about a vertical axis relative to the carriage assembly to actuate the brush between the extended position and a retracted position. The cam structure has an elliptical cross-section that includes a major axis and a minor axis. The major axis of the cam structure corresponds with actuation of the brush to the extended position. The minor axis of the cam structure corresponds with the retracted position of the brush. The carriage assembly further includes a first biasing member that is positioned between the cam structure and the brush. The first biasing member is a leaf spring and the cam structure acts directly upon the first biasing member. The first biasing member provides an extension force when the brush is in the extended position.

Embodiments of the third aspect of the present disclosure can include any one or a combination of the following features:
- a second biasing member that provides a retraction force to the brush, wherein the retraction force opposes the extension force of the first biasing member; and
- the first biasing member is a leaf spring.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 2:
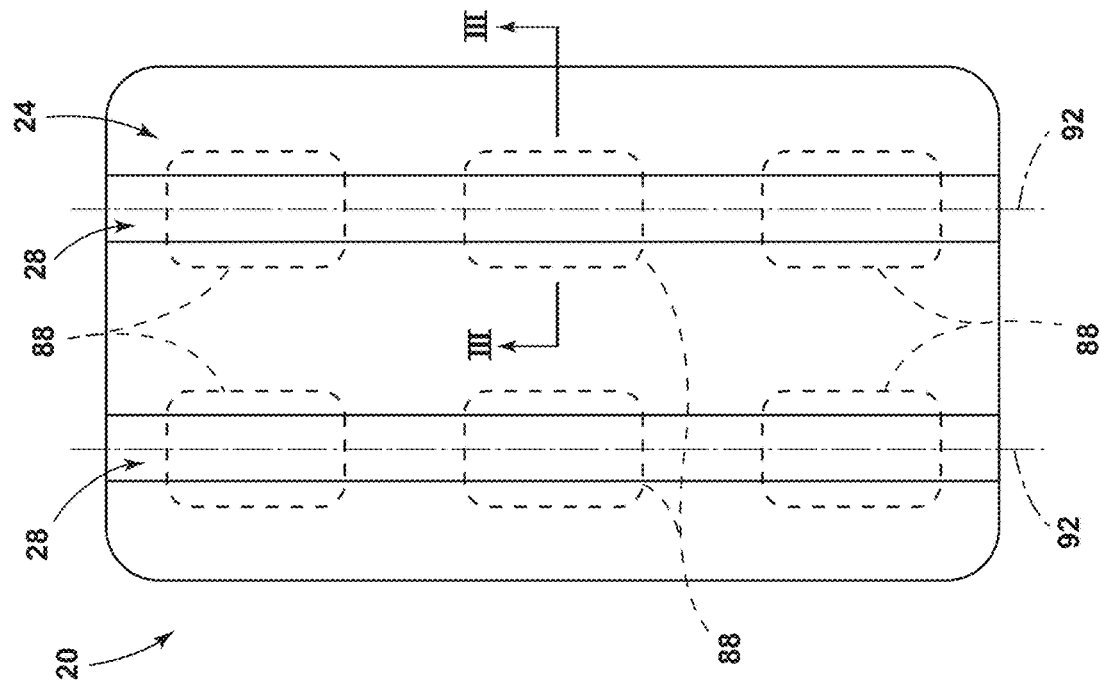
FIG. 2 is a top view of the cabin of the vehicle, illustrating track assemblies that the rail-mounted components couple to, according to one example.
Figure 1:
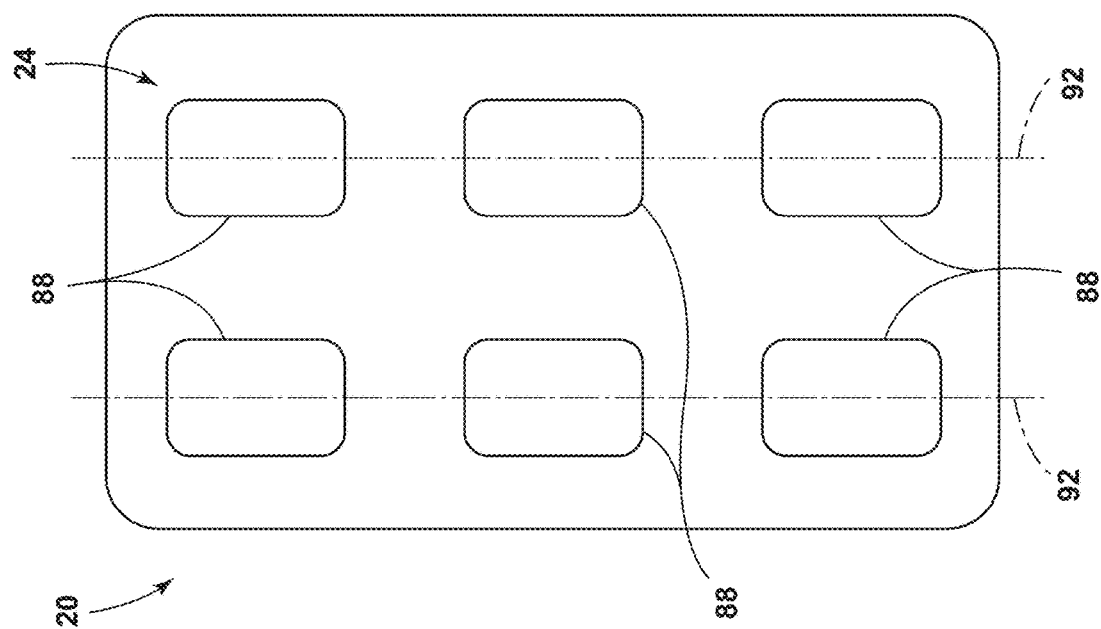
FIG. 1 is a top view of a cabin of a vehicle, illustrating rail-mounted components, according to one example.

For purposes of description herein, the terms "upper," "lower," "right," "left," "rear," "front," "vertical," "horizontal," and derivatives thereof shall relate to the concepts as oriented in FIGS. 1 and/or 3. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-14, reference numeral 20 generally designates a vehicle. The vehicle 20 includes a cabin 24 or interior. A track assembly 28 is mounted within the cabin 24. The track assembly 28 includes a rail structure 32. In various examples, one or more conductive members 36 are coupled to the rail structure 32. The vehicle 20 can also include a carriage assembly 40. The carriage assembly 40 is received by the track assembly 28. The carriage assembly 40 includes a brush assembly 44. The brush assembly 44 includes one or more brushes 48. The one or more brushes 48 are movable between extended and retracted positions. The extended position of the brush 48 results in engagement between the conductive member 36 of the track assembly 28 and the brush 48. The brush assembly 44 can be coupled to and/or contained within a housing 52 of the carriage assembly 40. The carriage assembly 40 can further include a cam structure 56 that is rotatable relative to the housing 52. Rotation of the cam structure 56 relative to the housing 52 of the carriage assembly 40 can actuate the one or more brushes 48 between the extended position and the retracted position. In various examples, the cam structure 56 can include a major axis 60 and a minor axis 64. The major axis 60 of the cam structure 56 can correspond with actuation of the one or more brushes 48 to the extended position. The minor axis 64 of the earn structure 56 can correspond with the retracted position of the one or more brushes 48. In some examples, a first biasing member 68 can be positioned between the cam structure 56 and the one or more brushes 48. In such an example, the cam structure 56 may act directly upon the first biasing member 68 when articulating the one or more brushes 48. The first biasing member 68 can provide an extension force when the one or more brushes 48 are in the extended position. Accordingly, the first biasing member 68 can bias the one or more brushes 48 to the extended position. The carriage assembly 40 can also include one or more rollers 72. The rollers 72 can be coupled to the cam structure 56. For example, the rollers 72 can be coupled to the cam structure 56 by an axle 76. Rotation of the cam structure 56 relative to the housing 52 can result in, or otherwise induce, rotational movement of the rollers 72 about a first axis of rotation 80 relative to the housing 52. The first axis of rotation 80 can generally correspond with, or be defined by, a centerline of the cam structure 56 (e.g., a vertical centerline). Rotation of the rollers 72 about the first axis of rotation 80 can transition the rollers 72 between an engaged position and a disengaged position relative to the track assembly 28. The axle 76 can define a second axis of rotation 84 of the rollers 72 relative to the housing 52. The rollers 72 may be passive (i.e., not driven) or the rollers 72 can be driven, for example by a motor.

Referring again to FIGS. 1-2, the vehicle 20 can be provided with a plurality of rail-mounted components 88. In examples, the rail-mounted components 88 may be, but are not limited to, seating assemblies, floor consoles, center consoles, storage units that include multiple storage compartments, and the like. In various examples, the rail-mounted component 88 can removably couple with the track assembly 28 and/or the rail structure 32. In some examples, the rail-mounted component(s) 88 can be coupled to more than one of the track assemblies 28 and/or rail structures 32 such that the rail-mounted component 88 is provided with multiple contact points to the vehicle 20 (e.g., at each corner of the rail-mounted component). The vehicle 20 can be provided with one or more of the track assemblies 28. The track assemblies 28 can be arranged along longitudinal, lateral, and/or angular (e.g., diagonal) directions within the cabin 24. In the depicted example, the track assemblies 28 are aligned in a longitudinal direction within the cabin 24 and the track assemblies 28 are arranged with centerlines 92 that are parallel to a longitudinal axis of the vehicle 20.

Figure 3:
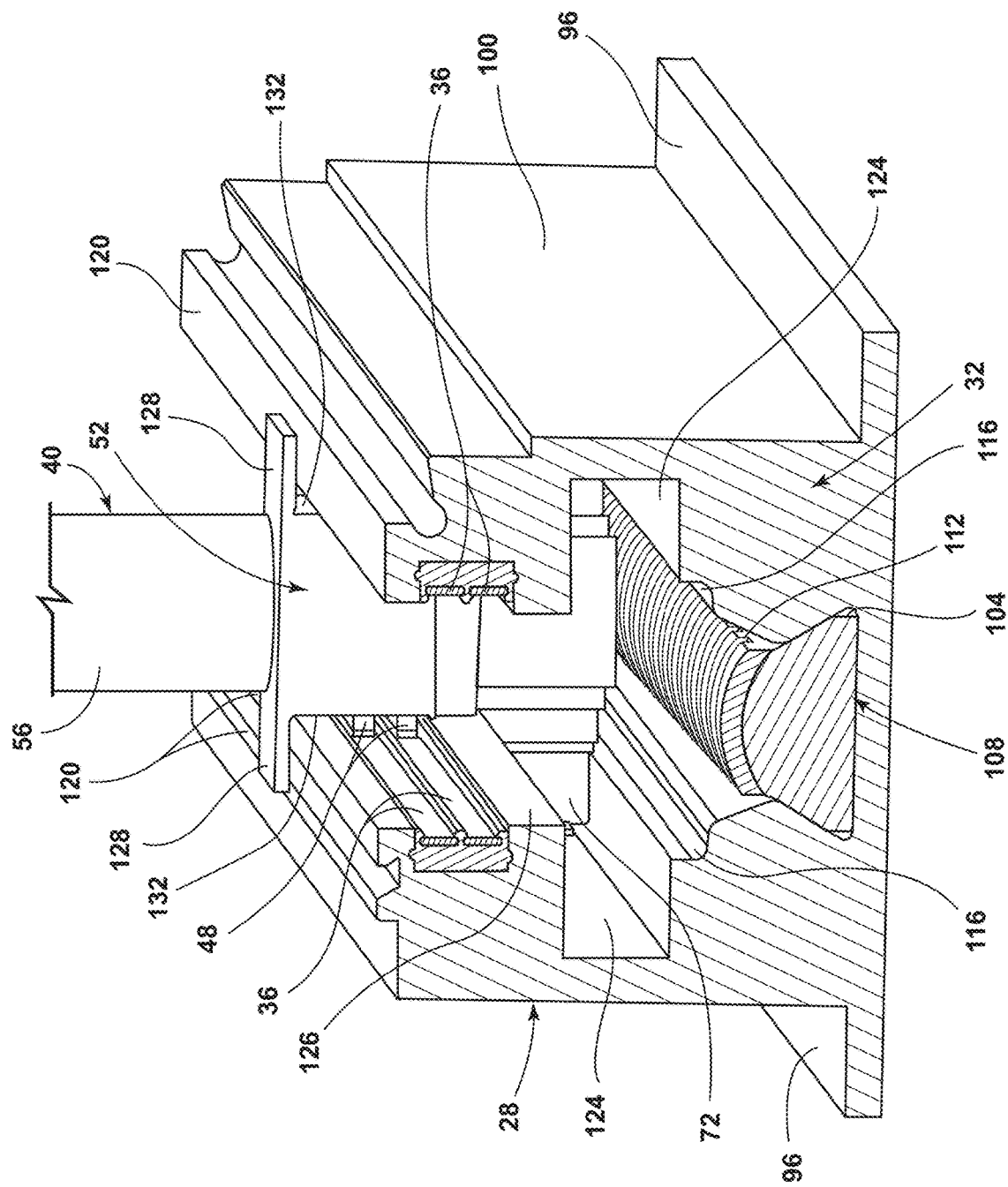
FIG. 3 is cross-sectional front perspective view of the track assembly, taken at line of FIG. 1, illustrating components of the track assembly and a coupling arrangement between the track assembly and a carriage assembly, according to one example.
Figure 4:
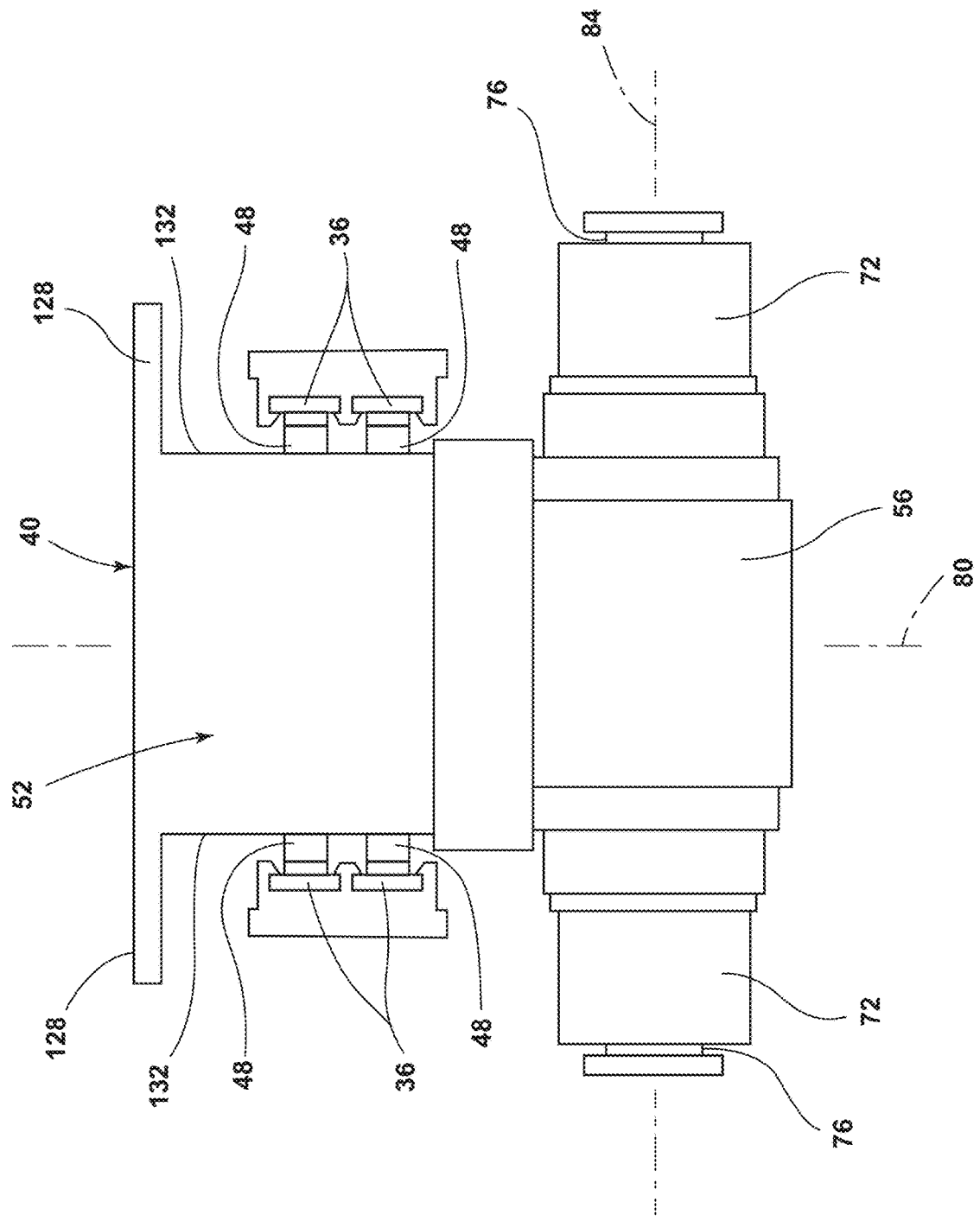
FIG. 4 is a front view of the carriage assembly, illustrating components of the carriage assembly and an engagement with conductive members of the track assembly, according to one example.
Figure 5:
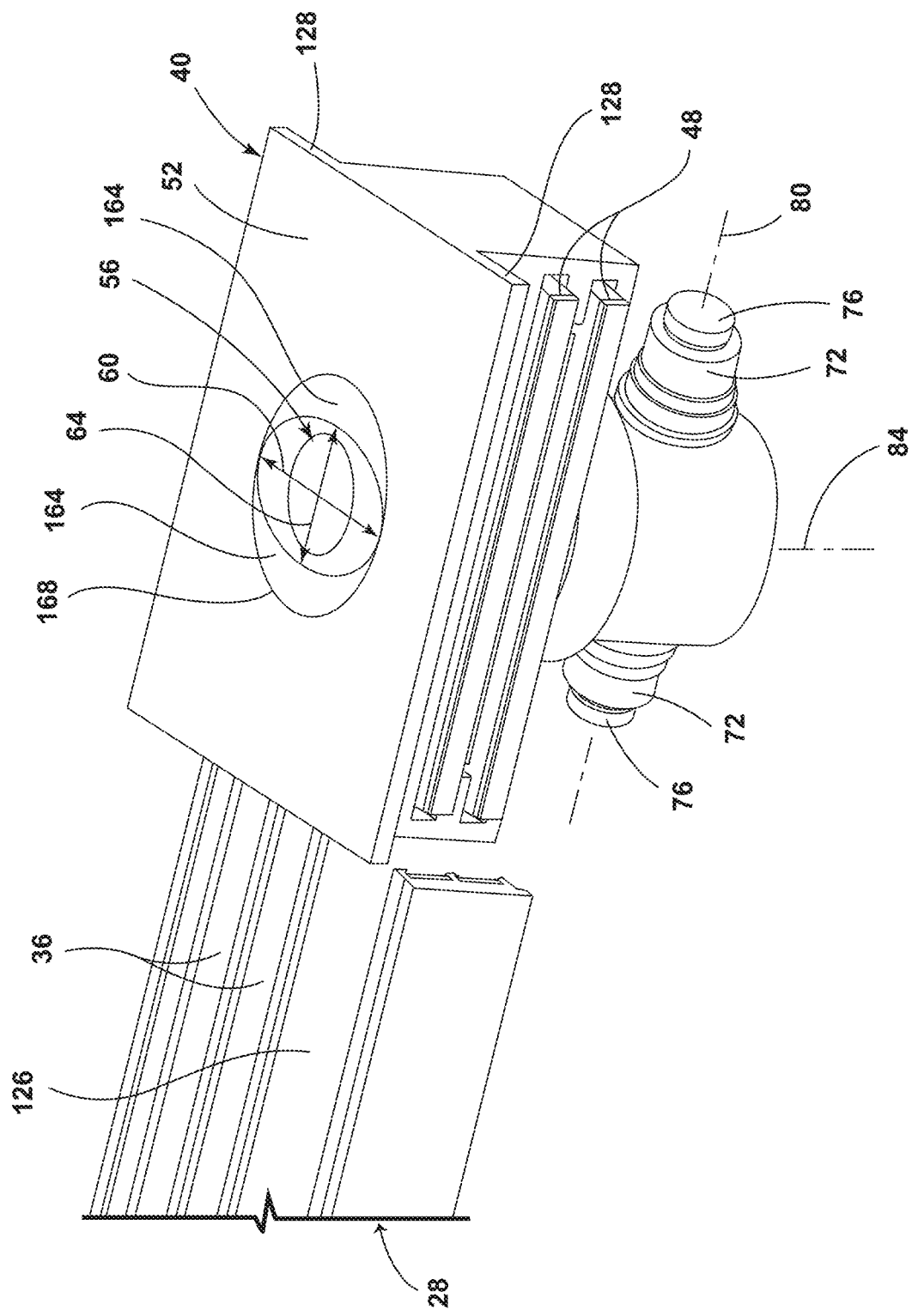
FIG. 5 is a rear perspective view of the carriage assembly, illustrating an alignment of the carriage assembly with the conductive members for subsequent coupling, according to one example.
Figure 6:
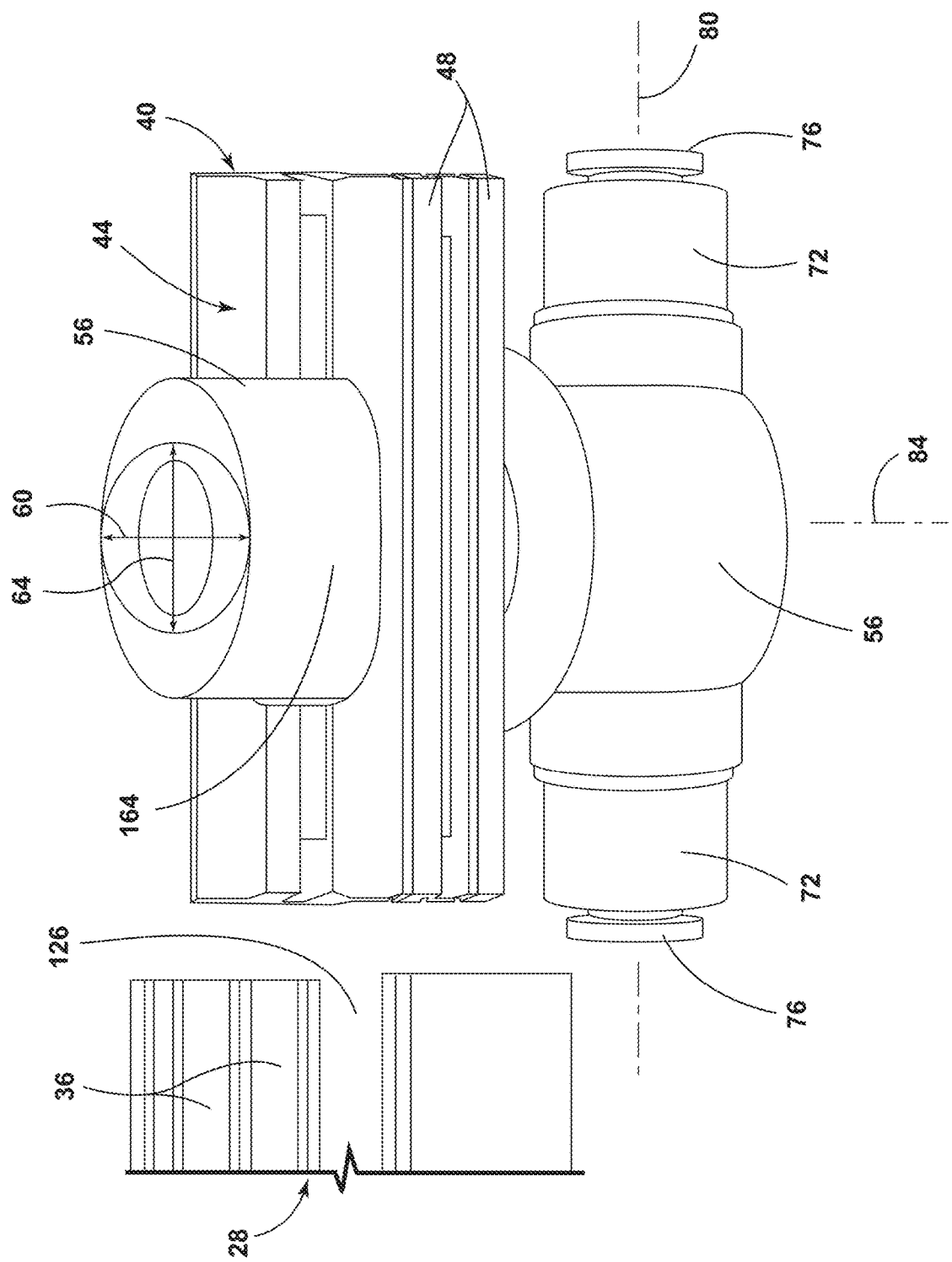
FIG. 6 is a side perspective view of the carriage assembly, illustrating the alignment of the carriage assembly with the conductive members for subsequent coupling, according to one example.

Referring now to FIGS. 3-4, the rail structure 32 can define coupling flanges 96 that extend outwardly from a main body 100 of the rail structure 32. The coupling flanges 96 can be used to couple the rail structure 32, and ultimately the track assembly 28, to the vehicle 20. For example, the coupling flanges 96 can be mounted or attached to a floor of the vehicle 20, a ceiling or roof of the vehicle 20, and/or sides of the vehicle 20 within the cabin 24. The coupling flanges 96 can be welded to the vehicle 20, fasteners (e.g., bolts, screws, or rivets) can pass through the coupling flanges 96 to engage with a portion of the vehicle 20 to retain the track assembly 28 to the vehicle 20, and/or the coupling flanges 96 can couple to the vehicle 20 by way of an interference fit with a portion of the vehicle 20. The rail structure 32 also defines a drive rack channel 104 that receives a drive rack 108. The drive rack 108 can be retained within the drive rack channel 104 by fasteners and/or an interference fit that prevents the drive rack 108 from unintentionally moving relative to the rail structure 32. An exposed surface of the drive rack 108 can be provided with rack teeth 112. The rack teeth 112 can be engaged by a portion of the carriage assembly 40 such that the carriage assembly 40 as a whole can move relative to the rail structure 32 and the drive rack 108. For example, a gear or wheel may climb and/or descend the drive rack 108 such that the carriage assembly 40 moves along the track assembly 28. The rail structure 32 may further define various other structures that aid in clearance of components of the carriage assembly 40 and/or aid in supporting the carriage assembly 40 and its components. For example, surfaces of an interior of the rail structure 32 that are proximate to the drive rack channel 104 can be provided as sloping away from the drive rack 108 and/or can be provided with grooves 116 that are sized and positioned to prevent binding or interference with a smooth traversal of the carriage assembly 40 along the rail structure 32.

Referring again to FIGS. 3-4, the various structures that aid in clearance of components of the carriage assembly 40 and/or aid in supporting the carriage assembly 40 and its components can also include bearing surfaces 120 that are defined by the rail structure 32. The bearing surfaces 120 can support at least a portion of the housing 52. The bearing surfaces 120 may be utilized to carry at least some of a weight of the rail-mounted component 88 that is coupled to the carriage assembly 40. The bearing surfaces 120 and the portion of the housing 52 that engages with the bearing surfaces 120 can be provided as a low-friction engagement such that slidable movement of the carriage assembly 40 along the track assembly 28 is not impeded. The low-friction engagement between the carriage assembly 40 and the track assembly 28 can at least partially enable a slidable engagement between the carriage assembly 40 and the track assembly 28. The rail structure 32 can define one or more roller channels 124 that receive the one or more rollers 72 when the rollers 72 are engaged with the track assembly 28. The rail structure 32 can also define a slot 126 through which the carriage assembly 40 extends such that the carriage assembly 40 is coupled to the track assembly 28 and the associated rail-mounted component 88. The rollers 72 enable a slidable engagement between the carriage assembly 40 and the track assembly 28. The portion of the housing 52 that engages with the bearing surfaces 120 can carry a majority of the weight of the carriage assembly 40 and the rail-mounted component 88 associated with the carriage assembly 40 such that the rollers 72 may be somewhat suspended within the rail structure 32. Accordingly, the rollers 72 are prevented from experiencing greater friction that can arise from the rollers 72 being pressed into a surface of the roller channels 124 that can result in an experienced friction of movement of the carriage assembly 40 along the track assembly 28 being increased. Proper weight distribution between components of the carriage assembly 40 and the track assembly 28 can aid in preventing premature wear and over taxing components of the carriage assembly 40 and/or the track assembly 28 (e.g., motors, gears, axles, wheels, rollers).

Referring further to FIGS. 3-4, the housing 52 can include protrusions 128 that extend radially outward from a side surface 132 of the housing 52. Said another way, the protrusions 128 extend in a radially outward direction relative to the first axis of rotation 80 or a centerline of the cam structure 56. The protrusions 128 engage with a surface of the bearing surfaces 120 such that weight of the carriage assembly 40 and/or the rail-mounted component 88 associated with the carriage assembly 40 can be transferred to the track assembly 28 in a manner that relieves at least some of the weight that would otherwise be carried by the rollers 72 and/or other components of the carriage assembly 40. The housing 52 and/or the protrusions 128 can be made of a material that has a low coefficient of friction with the rail structure 32. For example, the rail structure 32 may be made of extruded aluminum while the housing 52 and/or the protrusions 128 are made, in whole or in part, of an ultra-high-molecular-weight polyethylene. The housing 52 and the protrusions 128 do not rotate relative to the track assembly 28 when the cam structure 56 is rotated about the first axis of rotation 80. More specifically, the housing 52 can be sized and/or dimensioned such that the housing 52 cannot rotate within the slot 126 of the track assembly 28. Accordingly, as the cam structure 56 is rotated, the housing 52 can bear against the rail structure 32 as the torque necessary to actuate the cam structure 56 is applied.

Referring to FIGS. 5-8, the carriage assembly 40 is shown with the brushes 48 in the retracted position and the rollers 72 in the disengaged position prior to the carriage assembly 40 being coupled to the track assembly 28, which includes the conductive members 36. Loading the carriage assembly 40 onto the track assembly 28 in a manner similar to that depicted may be referred to as an end-loading approach. In the end-loading approach, the carriage assembly 40 is aligned with an end of the track assembly 28 in a manner that generally positions or aligns the components of the carriage assembly 40 with the corresponding structures defined within the track assembly 28 that receive the components of the carriage assembly 40. For example, the protrusions 128 on the housing 52 are positioned to engage with the bearing surfaces 120, the cam structure 56 is aligned with the slot 126, and the rollers 72 are positioned to engage with the roller channels 124 when the rollers 72 are actuated to the engaged position by the cam structure 56. The carriage assembly 40 can then be inserted into the track assembly 28 and supported by the engagement between the bearing surfaces 120 and the protrusions 128. After the carriage assembly 40 has been inserted into the track assembly 28 at the end of the track assembly 28 where end-loading is taking place, the cam structure 56 can be rotated about the first axis of rotation 80 such that the rollers 72 are actuated to the engaged position and/or the brushes 48 are actuated to the extended position. When the rollers 72 are in the engaged position with the track assembly 28, the rollers 72 can retain the carriage assembly 40 to the track assembly 28 in a direction that is non-parallel to the direction of travel along the track assembly 28 (e.g., in a vertical direction when the track assembly 28 is horizontally mounted to the vehicle 20). Alternatively, the carriage assembly 40 can be coupled to the track assembly 28 by way of a drop-in approach, which will be discussed in further detail below with reference to FIGS. 9A and 9B.

Figure 10:
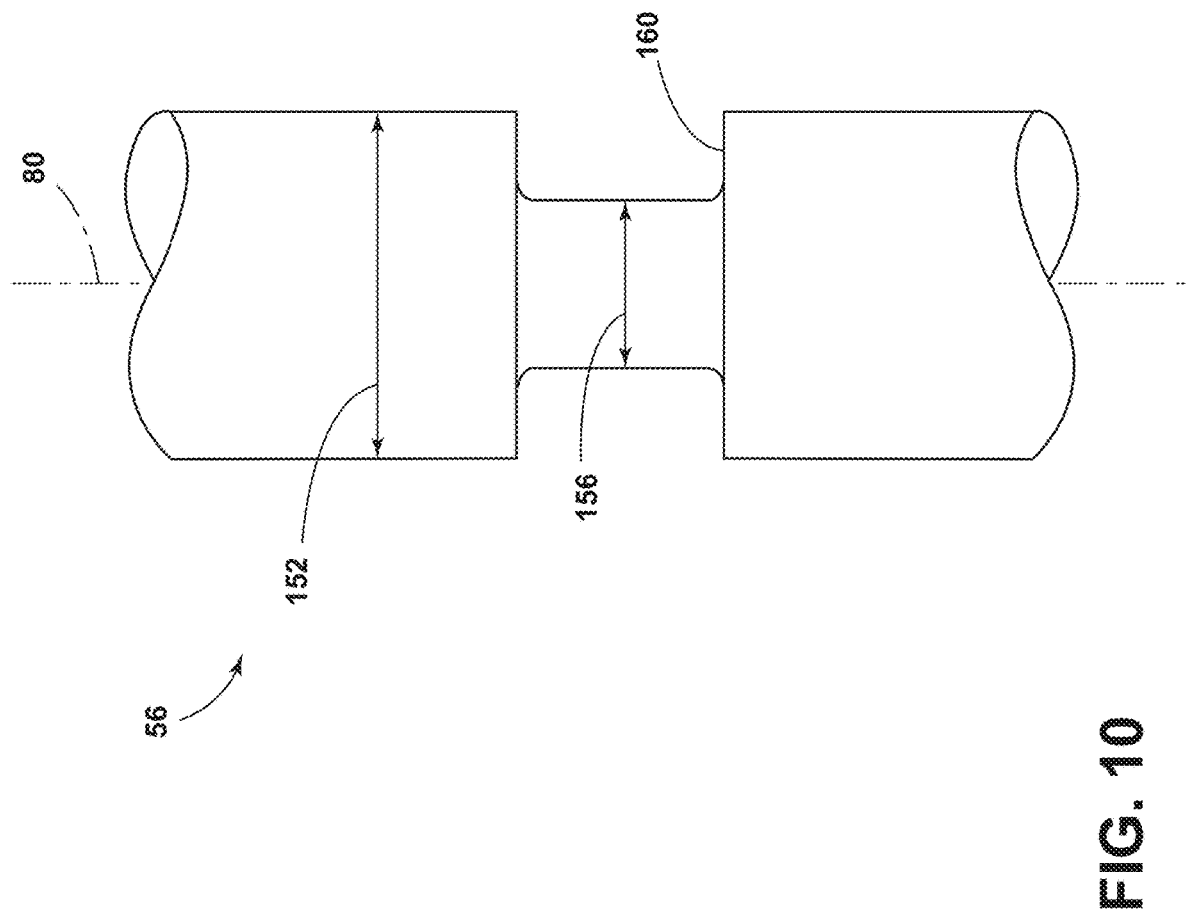
FIG. 10 is a front view of a portion of a cam structure of the carriage assembly, illustrating first and second diameters of the cam structure, according to one example.

Referring again to FIGS. 5-8, the cam structure 56 can be notched or grooved such that the cam structure 56 includes a first diameter 152 and a second diameter 156 (see FIG. 10). The first diameter 152 can be greater than the second diameter 156. The brush assembly 44 can be coupled to the cam structure at the second diameter 156 such that the brush assembly 44 and/or the brushes 48 are supported by resting upon a ledge 160 provided by the first diameter 152 (see FIG. 7). Accordingly, the brush assembly 44 and/or the brushes 48 can be supported and maintained in position on the cam structure 56 such that a designed alignment between the carriage assembly 40 and the track assembly 28 can be maintained to an extent that allows for proper alignment of the conductive members 36 and the brushes 48. Additionally, the notch or groove provided by the difference between the first diameter 152 and the second diameter 156 can guide the brushes 48 through the actuation of the brushes 48 between the extended and retracted positions while also permitting or providing the clearance necessary for the brushes 48 to actuate within the housing 52.

Referring further to FIGS. 5-8, in some examples, the cam structure 56 can be provided with the oblong, rectangular, or elliptical shape defined by the major axis 60 and the minor axis 64 along an entirety of a length of the cam structure 56. In such an example, the housing 52 may be provided with a carrier insert 164 that is positioned within a cam aperture 168. The cam aperture 168 is defined by the housing 52 and receives the cam structure 56 of the carriage assembly 40. When assembled, the carrier insert 164 can be employed to occupy a space between a wall of the cam aperture 168 and at least the minor axis 64 such that internal components of the carriage assembly 40 are protected from debris and foreign objects while also preventing unauthorized or unintended axis to the internal component of the carriage assembly 40 by a user. As the cam structure 56 is a rotatable component, it can be beneficial for the cam structure 56 to be provided with rounded edges (e.g., cylindrical, circular, or elliptical) such that rotational motion of the cam structure is not hindered. Accordingly, a minimum diameter of the cam aperture 168 may be dictated by the major axis 60 when the length of the cam structure 56 is provided with an oblong or elliptical shape. Therefore, in such an example, the carrier insert 164 can be sized, dimensioned, and/or positioned to occupy a radial or diametric difference between the minor axis 64 and the cam aperture 168. For example, one of the carrier inserts 164 can be positioned on either side of the cam structure 56 between an outer diameter of the cam structure 56 at the minor axis 64 and the diameter of the cam aperture 168 (see FIG. 5). Alternatively, the carrier insert 164 and the cam aperture 168 can have a diameter that is slightly larger than the major axis 60 such that carrier insert 164 has a continuous circumference. For example, the carrier insert 164 may incase or sheathe the cam structure 56, be provided as a sleeve to the cam structure 56, or otherwise receive the cam structure 56 in a manner that permits rotational motion of the cam structure 56 relative to the housing 52 while protecting internal components of the carriage assembly 40 (see FIG. 6). In various examples, the oblong or elliptical shape defined by the major axis 60 and the minor axis 64 may be provided solely in the region of the cam structure 56 that has the second diameter 156, which is smaller than the first diameter 152, such that the cam structure 56 itself seals, doses, or otherwise occupies the cam aperture 168 to prevent intrusion into the internal components of the carriage assembly 40 as discussed above, without employing the carrier insert 164 (see FIG. 7).

Figure 7:
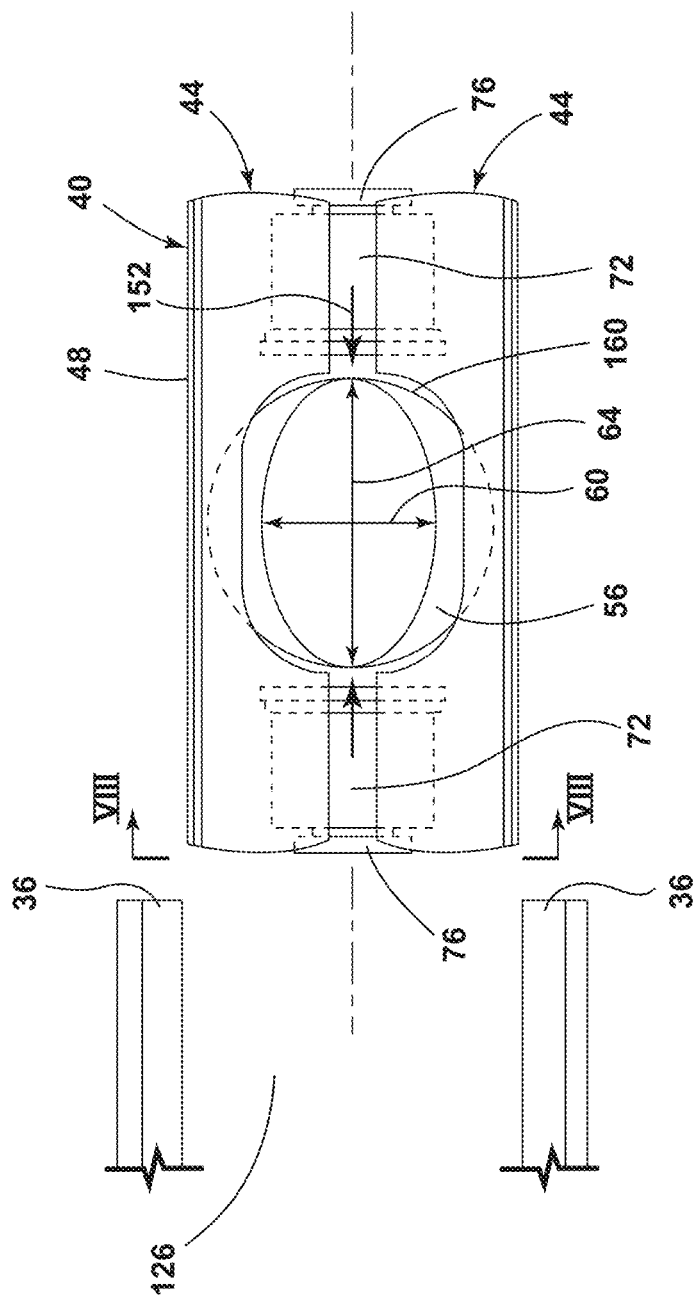
FIG. 7 is a top view of the carriage assembly, illustrating the alignment of the carriage assembly with the conductive members for subsequent coupling, according to one example.
Figure 8:
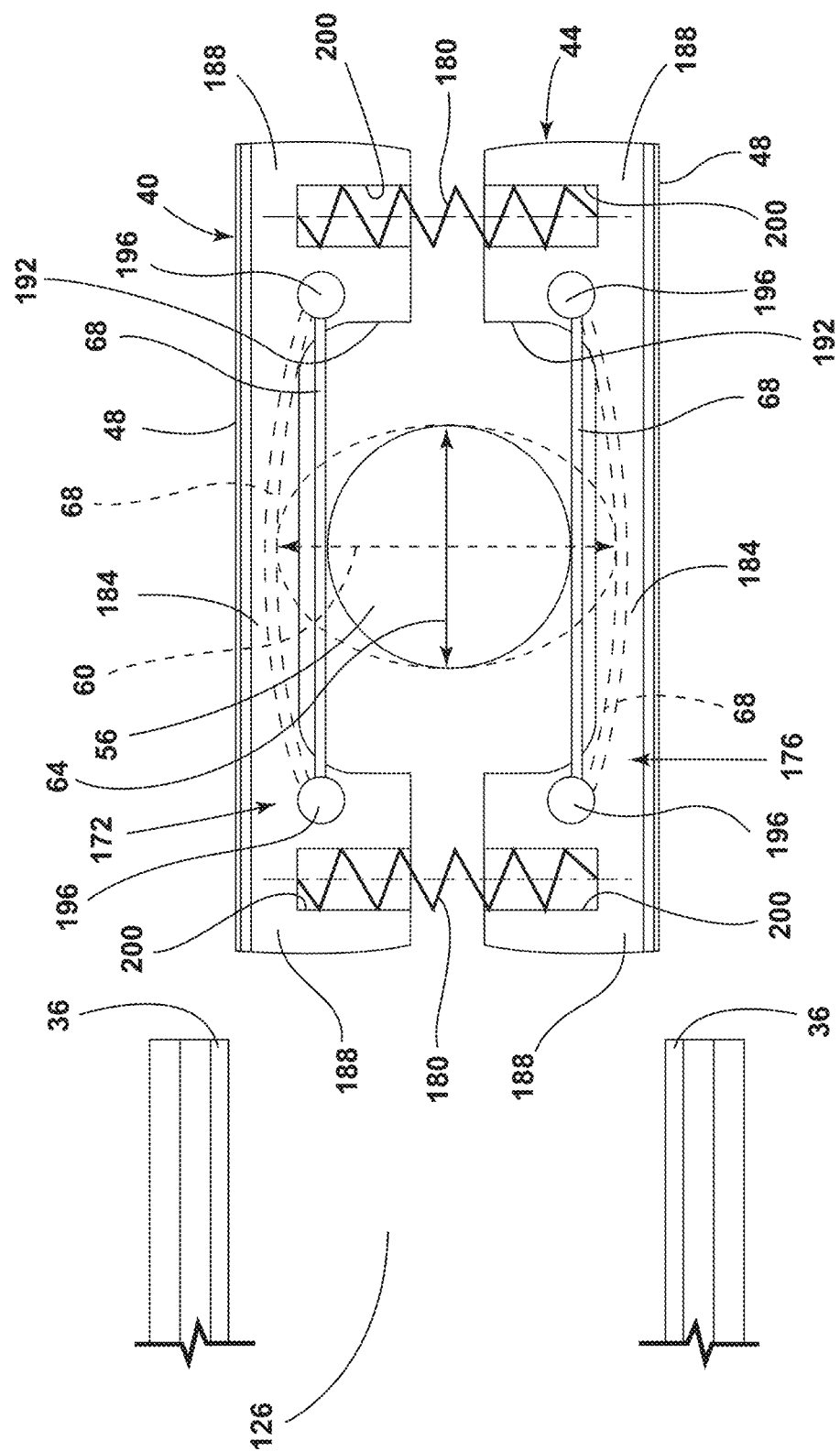
FIG. 8 is a top cross-sectional view of the carriage assembly, taken at line VIII-VIII of FIG. 7, illustrating various components of the carriage assembly, according to one example.
Figure 9:
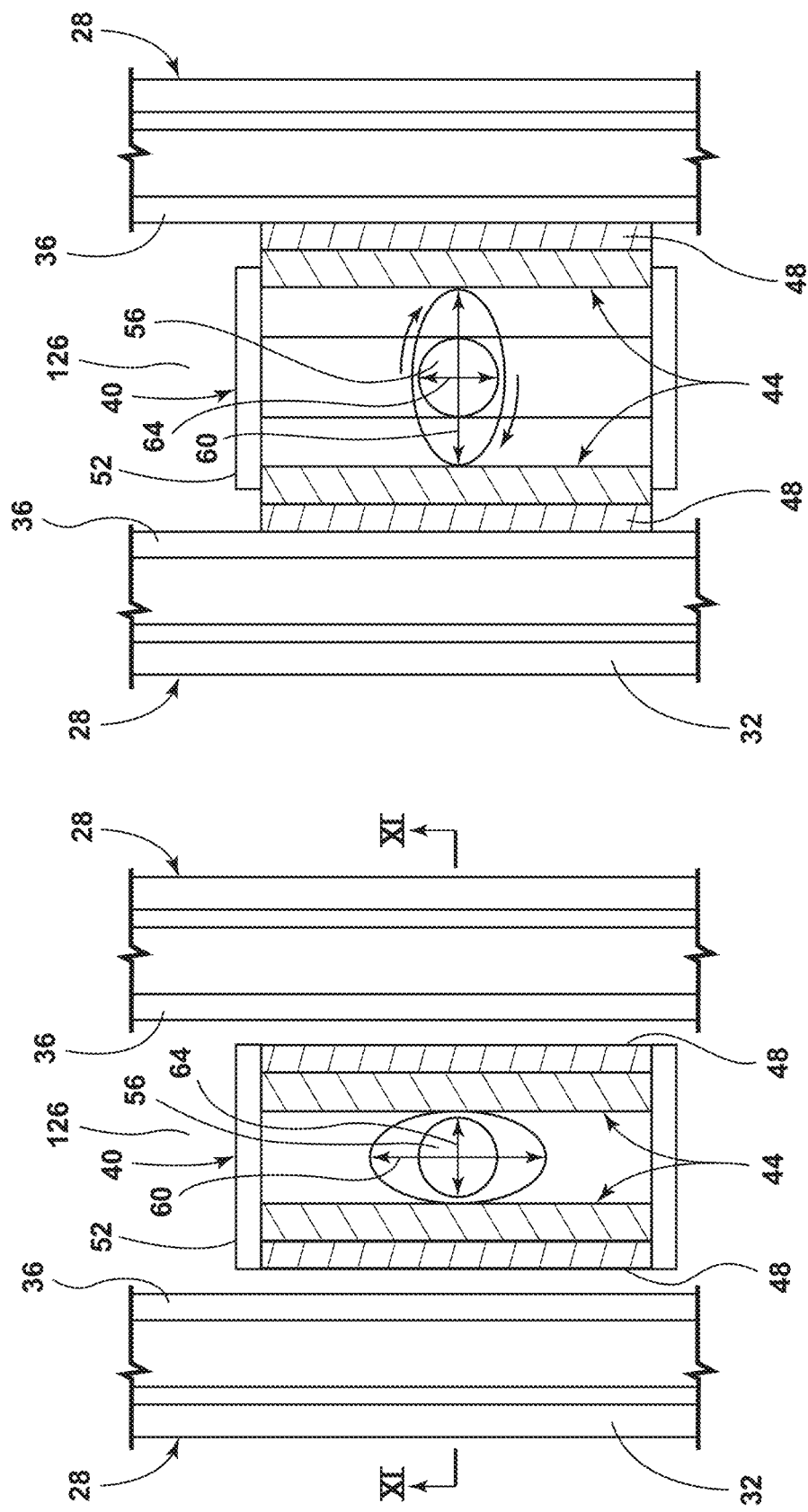
FIG. 9A is a top view of the carriage assembly being coupled to the track assembly, illustrating brushes of the carriage assembly in a retracted position.
FIG. 9B is a top view of the carriage assembly being coupled to the track assembly, illustrating the brushes of the carriage assembly in an extended position.

Referring now to FIGS. 7-8, the cam structure 56 can act directly upon the brush assembly 44 and/or the brushes 48 to actuate the brushes 48 between the retracted position and the extended position (see FIG. 7). In such an example, a biasing force, such as that provided by the first biasing member 68, is not utilized to actuate the brushes 48 to the extended position. Rather, the direct physical contact between the cam structure 56 and the brush assembly 44 or the brushes 48 results in actuation of the brushes 48 to the extended position. While the first biasing member 68 may be omitted from such an example, the brushes 48 may still be biased toward the retracted position. For example, the brushes 48 may be biased toward the retracted position by a spring, magnets, elastomeric materials, and so on. It may be beneficial to provide the carriage assembly 40 with the first biasing member 68 such that, upon actuation of the cam structure 56 to deploy the brushes 48 to the extended position, the first biasing member 68 provides an extension force that actively presses the brushes 48 into the conductive members 36. Accordingly, active contact can be maintained between the conductive members 36 and the brushes 48, which can aid in the transfer of power and/or data signals between the vehicle 20, the track assembly 28, the carriage assembly 40, and/or the rail-mounted components 88. In one example, the brush assembly 44 can include a first portion 172 and a second portion 176 that are spatially separated from one another. Said another way, the first and second portions 172, 176 can be separate pieces (e.g., separate halves) of the brush assembly 44 that can be coupled to one another. For example, the first and second portions 172, 176 of the brush assembly 44 can be coupled to one another by one or more second biasing members 180. The first and second portions 172, 176 include central regions 184 that are flanked on either side by inwardly extending arms 188. The central regions 184 have a thickness in a cross-sectional plane (e.g., a horizontal plane) that is less than a thickness of the inwardly extending arms 188 in the same cross-sectional plane. Accordingly, the central regions 184 and the inwardly extending arms 188 define a cavity 192 in each of the first and second portions 172, 176 of the brush assembly 44. The cavity 192 receives the cam structure 56. The first biasing member 68 can be coupled to the inwardly extending aims 188. The first biasing member 68 can extend across the cavity 192 and be positioned in an offset manner (e.g., horizontally offset) relative to an interior wall of the central region 184. Accordingly, the cam structure 56 can actuate the first biasing member 68 in a radially outward direction, which results in a deflection of the first biasing member 68 in an outward direction toward the interior wall of the central region 184 (see phantom lines in FIG. 8). The deflection or deformation of the first biasing member 68 stores energy within the first biasing member 68 and the first biasing member 68 seeks to dissipate the stored energy by assuming a non-deflected or non-deformed position (see solid lines in FIG. 8). Accordingly, the first biasing member 68 is induced by the cam structure 56 to provide an extension force to at least one of the brush assembly 44 and the brushes 48. This extension force encourages positive and active engagement between the brushes 48 and the conductive members 36. The coupling of the first biasing member 68 to the inwardly extending arms 188 can permit pivotable motion of a coupling point 196 relative to the brush assembly 44. For example, the coupling point 196 between the first biasing member 68 and the brush assembly 44 at the inwardly extending arms 188 can be a ball-and-socket type engagement. In the depicted example of FIG. 8, the first biasing member 68 is a linear length of material that can be deformed, where the non-deformed or linear position is a neutral position and the deformed or arcuate position is a stored-energy position. This linear length of material example of the first biasing member 68 can be referred to as a leaf spring.

Referring again to FIGS. 7-8, in various examples, the brush assembly 44 can be provided with one or more of the second biasing members 180. The second biasing member 180 can provide a retraction force. The retraction force may oppose the extension force provided by the first biasing member 68. The second biasing member 180 can bias the brushes 48 to the retracted position. In the depicted example of FIG. 8, the second biasing member 180 is received within retention slots 200 that are defined by the inwardly extending arms 188 of the brush assembly 44. The second biasing member 180 spans between the first and second portions 172, 176 of the brush assembly 44 to provide the retraction force to the brush assembly 44 and/or the brushes 48. Walls of the retention slots 200 help guide and retain the second biasing members 180 during the expansion and contraction events of the brush assembly 44 and/or the brushes 48 as the cam structure 56 is rotated. The second biasing member 180 can be a coil spring, a compression spring, a piece of elastomeric material, or any other suitable structure or material that biases the brush assembly 44 and/or brushes 48 to the retracted position.

Referring to FIGS. 9A-9B, the carriage assembly 40 may be coupled to the track assembly 28 with a drop-in approach. With the brush assembly 44 and/or the brushes 48 in the retracted position, as well as the rollers 72 in the disengaged position, the carriage assembly 40 may be inserted into the track assembly 28 by way of the slot 126. For example, the carriage assembly 40 can be positioned over the track assembly 28 and lowered into the slot 126 of the track assembly 28. Once the carriage assembly 40 has been inserted into the track assembly 28 to a sufficient degree that the rollers 72 can be coupled to the roller channels 124 upon rotation of the earn structure 56, the earn structure 56 may be rotated to deploy the brushes 48 and/or the rollers 72. The drop-in approach to coupling the carriage assembly 40 to the track assembly 28 may be preferable so that the rail-mounted component(s) 88 associated with the carriage assembly 40 can be coupled to and/or decoupled from the track assembly 28 at many locations along the track assembly 28 rather than only at an end of the track assembly 28.

Referring now to FIG. 10, the cam structure 56 can be provided with the first diameter 152 and the second diameter 156. The first diameter 152 can be greater than the second diameter 156. The brush assembly 44 can be coupled to the cam structure at the second diameter 156 such that the brush assembly 44 and/or the brushes 48 are supported by resting upon the ledge 160 provided by the first diameter 152. Accordingly, the brush assembly 44 and/or the brushes 48 can be supported and maintained in position on the cam structure 56 such that a designed alignment between the carriage assembly 40 and the track assembly 28 can be maintained to an extent that allows for proper alignment of the conductive members 36 and the brushes 48. Additionally, the notch or groove provided by the difference between the first diameter 152 and the second diameter 156 can guide the brushes 48 through the actuation of the brushes 48 between the extended and retracted positions while also permitting or providing the clearance necessary for the brushes 48 to actuate within the housing 52.

Figure 11:
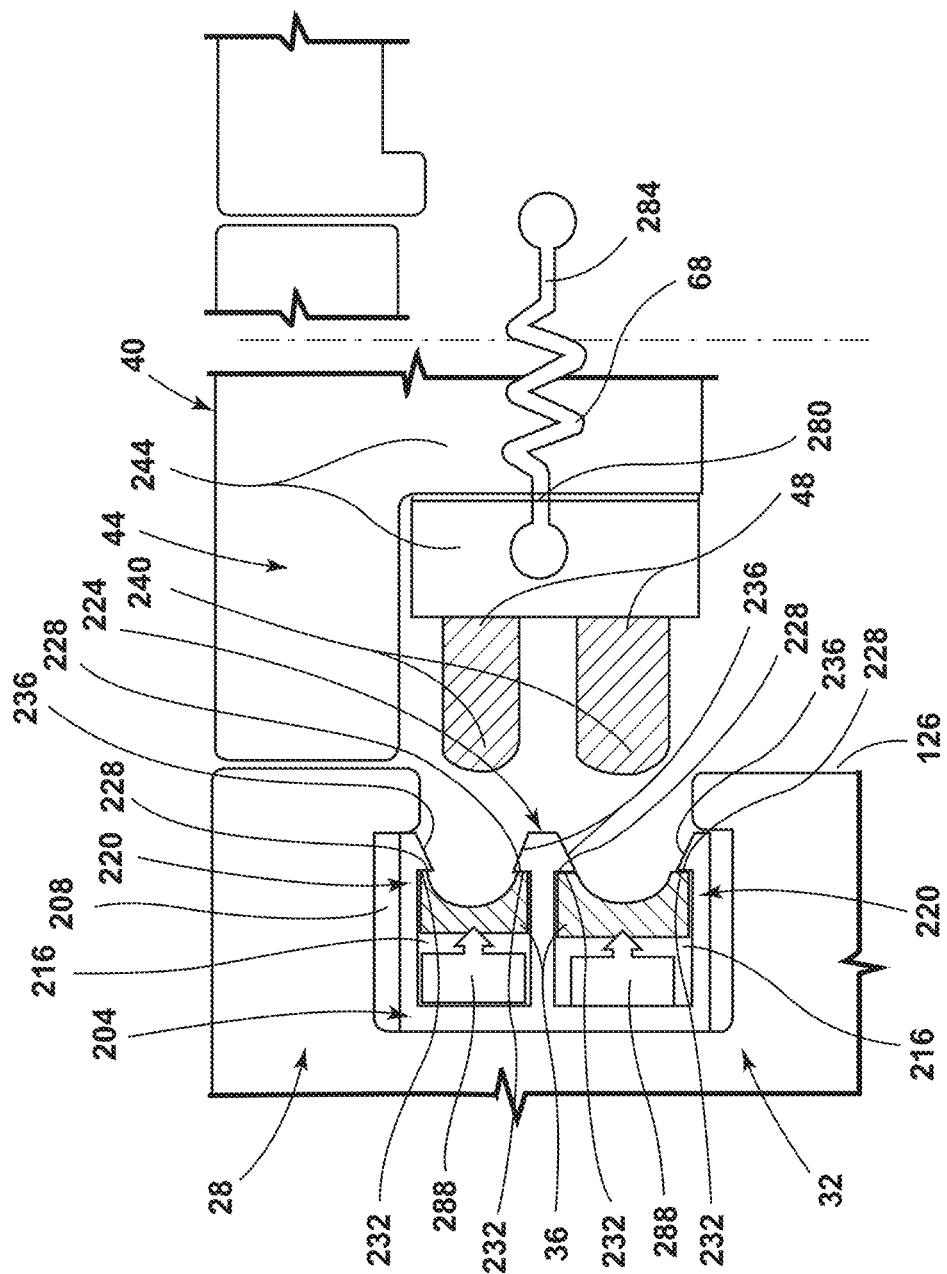
FIG. 11 is a cross-sectional view, taken at line XI-XI of FIG. 9A, illustrating an interaction between the carriage assembly and the track assembly, according to one example.
Figure 12:
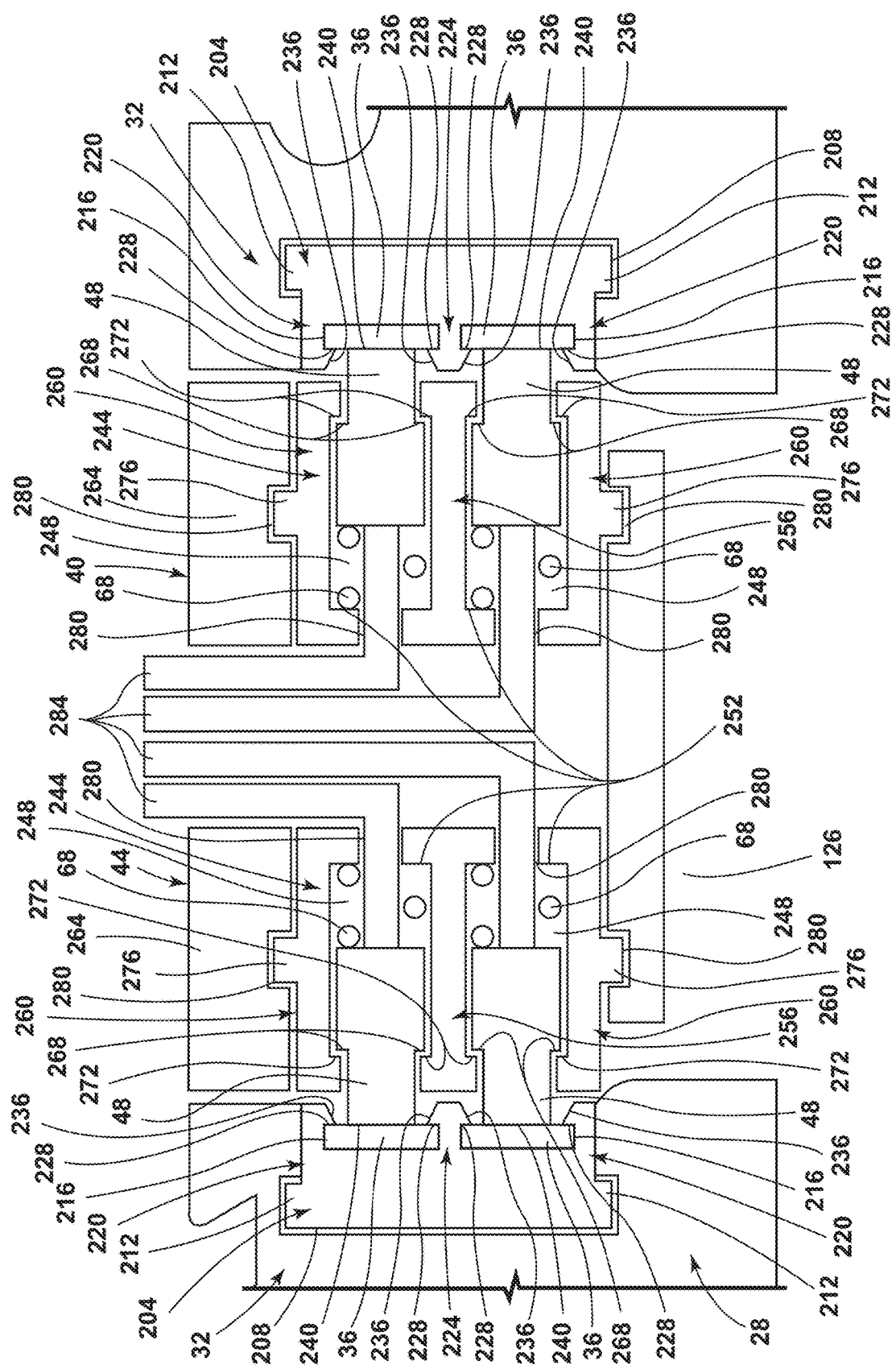
FIG. 12 is a cross-sectional view, taken at line XI-XI of FIG. 9A, illustrating an interaction between the carriage assembly and the track assembly, according to another example.
Figure 13:
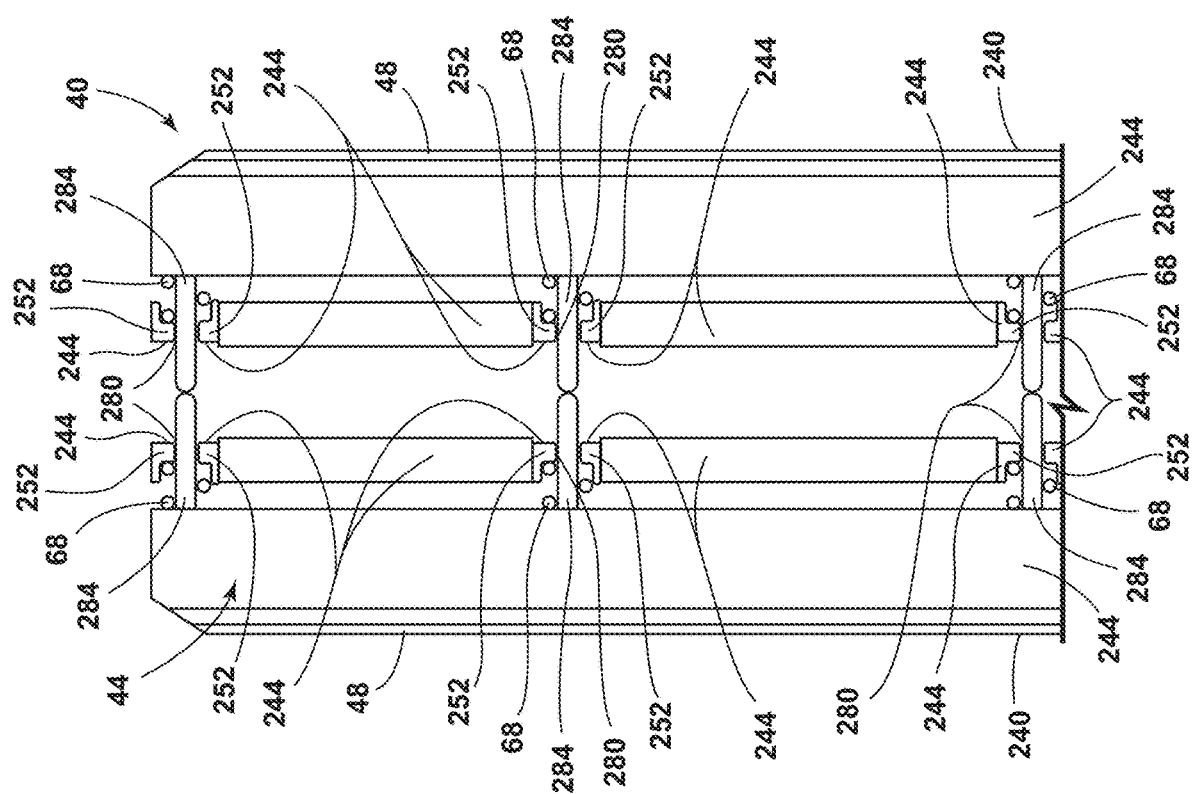
FIG. 13 is a top view of components of the carriage assembly, according to one example.

Referring to FIGS. 11-13, the one or more conductive members 36 can be contained within a conductive member housing 204. The conductive member housing 204 and the associated conductive member(s) 36 are received within a rail channel 208 of the rail structure 32. The rail channel 208 can be sized and dimensioned such that when the conductive member housing 204 and the associated conductive member(s) 36 are coupled to the rail channel 208, a transition between an interior surface of the rail structure 32 adjacent to the conductive member housing 204 and the conductive member housing 204 may be generally smooth, substantially smooth, smooth, generally free of protruding edges, substantially free of protruding edges, and/or free of protruding edges. The conductive member housing 204 can be provided with retention lips 212 that extend into corresponding portions of the rail channel 208 such that the conductive member housing 204 is retained within the rail channel 208. The conductive member housing 204 can be provided with a first thickness from which the retention lips 212 extend to define a second thickness that is greater than the first thickness. In the depicted example, the conductive members 36 are positioned within conductive member channels 216 that are defined by the conductive member housing 204. The conductive member housing 204 defines peripheral portions 220 that flank a central portion 224. The peripheral portions 220 and the central portion 224 each define one or more retaining protrusions 228 that aid in retention of the conductive members 36 within the conductive member channels 216. The retaining protrusions 228 on the peripheral portions 220 extend inwardly toward the central portion 224. Similarly, the retaining protrusions 228 on the central portion 224 extend outwardly toward the peripheral portions 220. The retaining protrusions 228 extend over a portion of the conductive members 36 such that an interference fit is provided between the retaining protrusions 228 and the conductive members 36. In some examples, the conductive members 36 can be provided with shoulders 232. In either instance, the retaining protrusions 228 engage with the conductive members 36 such that the conductive members 36 are retained within the conductive member channels 216 in directions that are non-parallel to a direction of travel of the rail-mounted components 88 along the track assembly 28.

Referring again to FIGS. 11-13, the peripheral portions 220 and the central portion 224 can include one or more tapered edges 236. The tapered edges 236 can aid in locating or receiving engagement portions 240 of the brushes 48 that are provided in the carriage assembly 40. Said another way, upon misalignment of the brushes 48 relative to the conductive members 36, the engagement portion 240 of the brushes 48 may contact the tapered edges 236 of the peripheral and/or central portions 220, 240. In such a situation, the tapered edges 236 can aid in guiding the engagement portions 240 into contact with the conductive members 36 such that a connection is established between the conductive members 36 and the brushes 48. The brush assembly 44 can include a carrier portion 244 and the engagement portions 240 of the brushes 48. The engagement portions 240 can be coupled to the carrier portions 244 such that the engagement portions 240 are positioned between the carrier portions 244 and the conductive members 36 when in-use. The carrier portions 244 can define brush channels 248 that the brushes 48 travel within or are housed within. The brush channels 248 can include rearward walls 252, interior walls 256, and exterior walls 260. While referred to as exterior walls 260, the exterior walls 260 are not intended to be limited to a wall or surface of the brush assembly 44 that is the outer-most wall or surface of the brush assembly 44. Rather, the use of the term exterior walls 260 is intended to also refer to walls or surfaces of the carrier portion 244 that engage with an immediately adjacent portion of the brush assembly 44 and/or the carriage assembly 40. For example, the exterior walls 260 depicted in the example of FIG. 12 engage with a brush housing 264 that is the adjacent component of the brush assembly 44. The brush housing 264 can be a casing or other exterior surface to the unit of the brush assembly 44. The interior walls 256 are positioned between the exterior walls 260.

Referring further to FIGS. 11-13, the brushes 48 can include shoulders 268, similar to the shoulders 232 of an example of the conductive members 36, which extend outwardly from a thickness of the engagement portion 240 of the brushes 48. Accordingly, the engagement portion 240 defines a first thickness of the brush 48 and the shoulders 268 define a second thickness of the brush 48, where the second thickness is greater than the first thickness. Similar to the conductive member housing 204, the carrier portion 244 of the brush assembly 44 can include retaining protrusions 272 that are defined by the interior and exterior walls 256, 260 of the carrier portion 244. The retaining protrusions 272 extend over the shoulders 268 of the brushes 48 such that the brushes 48 are retained within the brush channels 248 that are defined by the carrier portion 244. The relative dimensions of the brushes 48 and the brush channels 248 can provide for actuation of the brush 48 relative to the associated brush channel 248. For example, the first biasing members 68 in the carriage assembly 40 can bias the brushes 48 to an extended position when the cam structure 56 is actuated such that the brush 48 is encouraged to actively engage with the conductive member 36 in the track assembly 28. The engagement portion 240 of the brush 48 can have a length that is longer than a length of the portion of the brush 48 that has the second thickness that defines the shoulders 268. Additionally, the brush channels 248 can be provided with dimensions that are greater than the length of the portion of the brush 48 that defines the shoulders 268. Accordingly, if the engagement portion 240 wears over time such that the length of the engagement portion 240 decreases as a function of time, the first biasing members 68 can bias the brush 48 to the extended position such that the engagement portion 240 remains capable of contacting the conductive members 36. As with the conductive member housing 204 of the track assembly 28, the carrier portion 244 of the brush assembly 44 can define retention lips 276 that engage with a corresponding portion of the brush housing 264, such as a retention slot 280, such that the carrier portion 244 is retained within the brush housing 264 in directions that are non-parallel to a direction of actuation along the track assembly 28.

Referring still further to FIGS. 11-13, the first biasing member 68 can be positioned between a rearward surface of the brush 48 and the rearward wall 256 of the carrier portion 244. Accordingly, the first biasing member 68 can bear against the rearward wall 256 and the rearward surface of the brush 48 to provide the extension force that places the brush 48 in the extended position. In various examples, the rearward wall 252 of the carrier portion 244 can define a conduit aperture 280 in regions that are proximate the brush channels 248. The conduit apertures 280 can be utilized for coupling conduits 284 to the brushes 48. The conduits 284 can be coupled to power consuming components on the rail-mounted components 88, data receiving components on the rail-mounted components 88, and/or data providing components on the rail-mounted components 88. For examples, the conduits 284 may be coupled to a plug that is provided on the carriage assembly 40 that is engaged by a complementary plug provided on the rail-mounted component 88 that is coupled to the carriage assembly 40. Alternatively, the carriage assembly 40 may be integral with or unitarily formed with the rail-mounted component 88 such that the conduits 284 are hardwired or directly wired to relevant components on the rail-mounted component 88. Power consuming components can include, but are not limited to, occupancy sensors, restraint systems, heating and ventilation assemblies, motors, actuators, light sources, entertainment systems, and so on. Data receiving and/or data providing components can include, but are not limited to, occupancy sensors, restraint systems, thermal sensors, heating and ventilation assemblies, motors (e.g., rotational position), entertainment systems, and so on. In general, the conductive members 36, the brushes 48, and the conduits 284 can be employed to monitor and/or query operational statuses of the rail-mounted components 88 and provide communication connections for power and/or data signals to be transmitted/received between the vehicle 20 and the rail-mounted components 88. In some examples, the first biasing member 68 can provide the extension force to the brush 48 while simultaneously serving as the conduit 284 (see FIG. 11). In such an example, it can be beneficial for the first biasing member 68 to be made of, or coated in, a material that is conductive (e.g., steel or copper). In some examples, the track assembly 28 can be provided with a third biasing member 288 that biases the conductive member 36 toward an extended position relative to the conductive member channels 216. Said another way, the third biasing member 288 can bias the conductive members 36 toward the brushes 48 such that an active engagement between the conductive members 36 and the brushes 48 is further encouraged and/or facilitated.

Figure 14:
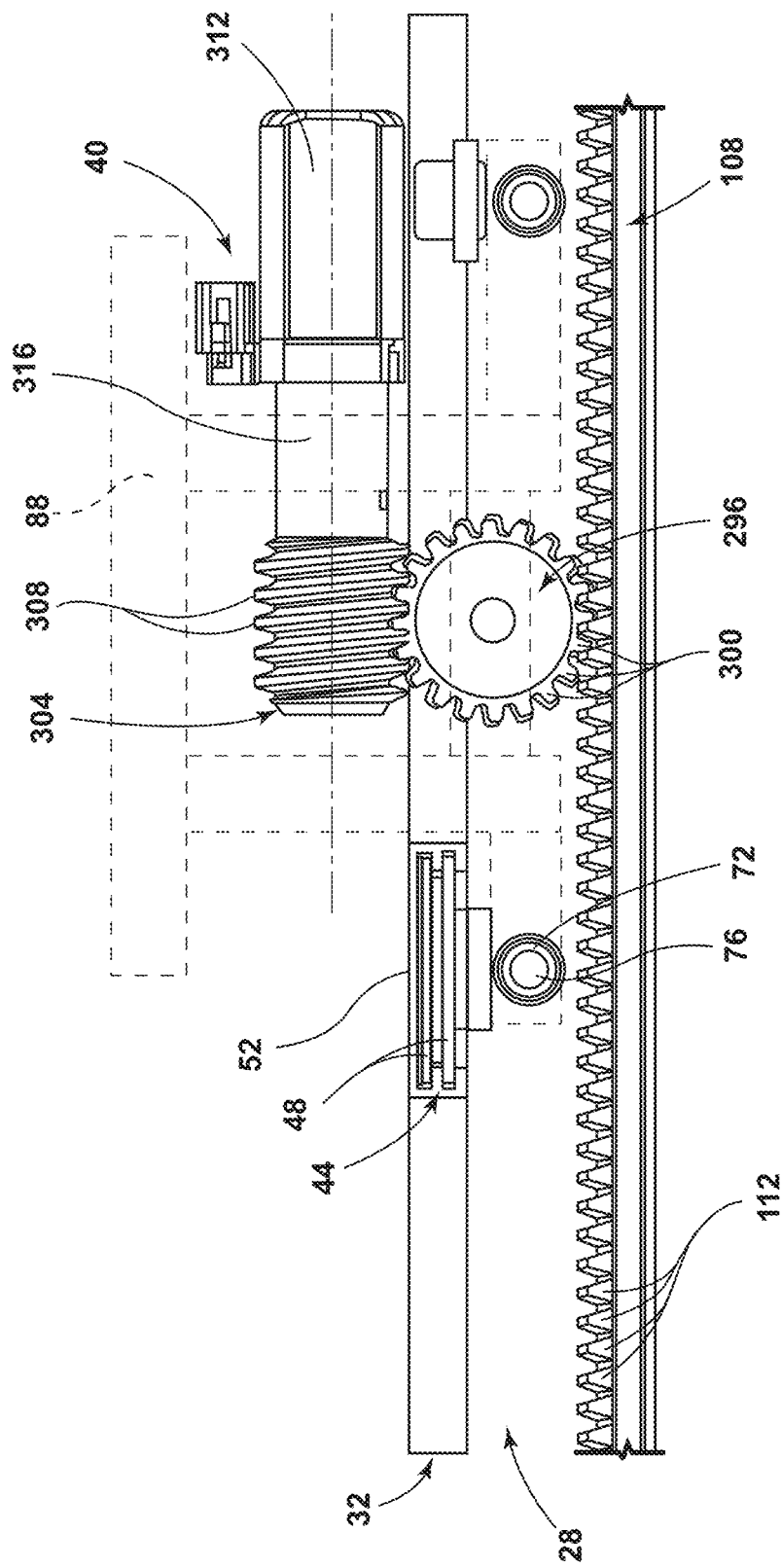
FIG. 14 is a side view of the carriage assembly engaged with the track assembly, illustrating a drive assembly, according to one example.

Referring now to FIG. 14, the carriage assembly 40 can also include a drive gear 296 that engages with the drive rack 108 such that the carriage assembly 40 can traverse the track assembly 28. For example, the drive gear 296 can include drive teeth 300 positioned about a circumference thereof that engage with the rack teeth 112 of the drive rack 108. The drive teeth 300 are also engaged by a worm gear 304. Specifically, worm teeth 308 of the worm gear 304 engage with the drive teeth 300 in a mating fashion. The worm gear 304 is coupled to a motor 312 by a drive shaft 316. Accordingly, the motor 312 can drive the worm gear 304 to rotate the drive gear 296 and ultimately actuate the carriage assembly 40 and the rail-mounted component 88 along the track assembly 28. In various examples, the rail-mounted component 88 can be a seating assembly, one or more storage units, consoles, tables, or any other desirable structure within the cabin 24 of the vehicle 20. With the rail-mounted component 88 being movable about the cabin 24 by way of the track assembly 28 and the carriage assembly 40, a user can arrange the cabin 24 to the preferences or needs for a given time of travel or task. In the depicted example, the track assembly 28 and the carriage assembly 40 engage in a rack-and-pinon manner by way of the drive rack 108 and the drive gear 296. However, the track assembly 28 and the carriage assembly 40 may engage in other manners. For example, the track assembly 28 and the carriage assembly 40 can engage in a rack-screw manner where the rack teeth 112 of the drive rack 108 more closely resemble the threads on a screw. In such an example, the drive gear 296 may be provided as a worm gear, similar to the worm gear 304 depicted. The worm gear 304 in such an example may be directly driven by the motor 312 or the motor 312 may directly drive intermediate gears or wheels to ultimately transmit the motion into actuation along the track assembly 28. The intermediate gears or wheels that are positioned between the motor 312 and the gear or wheel that engages with the drive rack 108 may be referred to as transmission gears, as these intermediate gears transmit the rotational motion of the motor 312.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a cabin;
   a track assembly mounted within the cabin, wherein the track assembly comprises:
     a rail structure; and
     a conductive member coupled to the rail structure; and
   a carriage assembly that is received by the track assembly, wherein the carriage assembly comprises:
     a brush that is movable to an extended position to engage with the conductive member of the track assembly;
     a first biasing member that provides an extension force when the brush is in the extended position; and
     a cam structure that actuates the brush between the extended position and a retracted position, wherein the cam structure acts upon the first biasing member, and wherein the first biasing member in turn acts upon the brush.

2. The vehicle of claim 1, wherein the cam structure is rotated about a vertical axis to actuate the brush between the extended position and the retracted position.

3. The vehicle of claim 1, wherein the cam structure comprises a major axis and a minor axis.

4. The vehicle of claim 3, wherein the major axis of the cam structure acts upon the brush in a manner that actuates the brush to the extended position.

5. The vehicle of claim 4, wherein the minor axis of the cam structure acts upon the brush in a manner that actuates the brush to the retracted position.

6. The vehicle of claim 3, wherein the cam structure has a cross-sectional shape that is elliptical.

7. The vehicle of claim 1, wherein the first biasing member is a coil spring.

8. The vehicle of claim 1, wherein the first biasing member is a leaf spring.

9. The vehicle of claim 1, further comprising:
   a second biasing member that provides a retraction force, wherein the retraction force opposes the extension force of the first biasing member.

10. The vehicle of claim 9, wherein the second biasing member biases the brush to a retracted position.

11. A vehicle, comprising:
    a cabin;
    a track assembly mounted within the cabin, wherein the track assembly comprises:
      a rail structure; and
      a conductive member coupled to the rail structure; and
    a carriage assembly that is received by the track assembly, wherein the carriage assembly comprises:
      a brush that is movable to an extended position to engage with the conductive member of the track assembly;
      a cam structure, wherein the cam structure is rotatable relative to the carriage assembly to actuate the brush between the extended position and a retracted position, wherein the cam structure comprises a major axis and a minor axis, wherein the major axis of the cam structure corresponds with actuation of the brush to the extended position, and wherein the minor axis of the cam structure corresponds with the retracted position of the brush; and
      a first biasing member that is positioned between the cam structure and the brush, wherein the cam structure acts directly upon the first biasing member, and wherein the first biasing member provides an extension force when the brush is in the extended position.

12. The vehicle of claim 11, further comprising:
    a second biasing member that provides a retraction force to the brush, wherein the retraction force opposes the extension force of the first biasing member.

13. The vehicle of claim 11, wherein the cam structure has a cross-sectional shape that is elliptical.

14. The vehicle of claim 11, wherein the first biasing member is a coil spring.

15. The vehicle of claim 11, wherein the first biasing member is a leaf spring.

16. A vehicle, comprising:
    a cabin;
    a track assembly mounted within the cabin, wherein the track assembly comprises:
      a rail structure; and
      a conductive member coupled to the rail structure; and
    a carriage assembly that is received by the track assembly, wherein the carriage assembly comprises:
      a brush that is movable to an extended position to engage with the conductive member of the track assembly;
      a cam structure, wherein the cam structure is rotatable about a vertical axis relative to the carriage assembly to actuate the brush between the extended position and a retracted position, wherein the cam structure has an elliptical cross-section that comprises a major axis and a minor axis, wherein the major axis of the cam structure corresponds with actuation of the brush to the extended position, and wherein the minor axis of the cam structure corresponds with the retracted position of the brush;
      a first biasing member that is positioned between the cam structure and the brush, wherein the first biasing member is a leaf spring and the cam structure acts directly upon the first biasing member, and wherein the first biasing member provides an extension force when the brush is in the extended position.

17. The vehicle of claim 16, further comprising:
    a second biasing member that provides a retraction force to the brush, wherein the retraction force opposes the extension force of the first biasing member.

18. The vehicle of claim 16, wherein the first biasing member is a leaf spring.

* * * * *